US012021829B2

(12) United States Patent
Rye et al.

(10) Patent No.: US 12,021,829 B2
(45) Date of Patent: Jun. 25, 2024

(54) DISCOVERING AND CLUSTERING IPv6 ADDRESSES BY HARDWARE IDENTIFIERS

(71) Applicant: THE UNITED STATES OF AMERICA, AS REPRESENTED BY THE SECRETARY OF THE NAVY, Arlington, VA (US)

(72) Inventors: Eric Charles Rye, Severna Park, MD (US); Robert Edward Beverly, IV, Carmel, CA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 17/966,537

(22) Filed: Oct. 14, 2022

(65) Prior Publication Data

US 2023/0120443 A1 Apr. 20, 2023

Related U.S. Application Data

(60) Provisional application No. 63/255,827, filed on Oct. 14, 2021.

(51) Int. Cl.
| | |
|---|---|
| *H04L 12/24* | (2006.01) |
| *H04L 12/26* | (2006.01) |
| *H04L 61/5007* | (2022.01) |
| *H04W 8/26* | (2009.01) |
| *H04L 101/659* | (2022.01) |
| *H04W 84/12* | (2009.01) |

(52) U.S. Cl.
CPC .......... *H04L 61/5007* (2022.05); *H04W 8/26* (2013.01); *H04L 2101/659* (2022.05); *H04W 84/12* (2013.01)

(58) Field of Classification Search
None
See application file for complete search history.

(56) References Cited

U.S. PATENT DOCUMENTS

| | | | | |
|---|---|---|---|---|
| 8,989,101 | B1* | 3/2015 | Mishra | H04W 48/16 |
| | | | | 370/252 |
| 2006/0200843 | A1* | 9/2006 | Morgan | H04W 4/029 |
| | | | | 725/78 |
| 2015/0282149 | A1* | 10/2015 | Abraham | H04W 72/20 |
| | | | | 370/329 |
| 2017/0078950 | A1* | 3/2017 | Hillary | H04W 60/00 |
| 2020/0389469 | A1* | 12/2020 | Litichever | H04W 4/40 |
| 2021/0099347 | A1* | 4/2021 | Allshouse | H04W 40/24 |
| 2022/0200850 | A1* | 6/2022 | Airy | H04L 41/0806 |

* cited by examiner

*Primary Examiner* — Christopher B Robinson
(74) *Attorney, Agent, or Firm* — Naval Postgraduate School; Scott Bell

(57) ABSTRACT

The invention relates to discovering and clustering Internet protocol addresses. For example, the invention can include discovering an IPv6 address of an Internet-facing device on a network, where the IPv6 address is associated with a wide area network (WAN) media access control (MAC) address and a WiFi basic service set identifier (BSSID), identifying an associated BSSID in WiFi geolocation databases based on the WAN and WiFi BSSID, and geolocating the Internet-facing device by retrieving a location record in the WiFi geolocation databases for the associated BSSID.

9 Claims, 4 Drawing Sheets

DISCOVERING AND CLUSTERING IPv6 ADDRESSES BY HARDWARE IDENTIFIERS

CROSS REFERENCE TO RELATED PATENT(S) AND APPLICATION(S)

This application claims the benefit of U.S. Provisional Application No. 63/255,827 filed Oct. 14, 2021, and entitled Discovering And Clustering IPv6 Addresses by Hardware Identifiers, which is hereby incorporated in its entirety by reference.

BACKGROUND

Media Access Control (MAC) addresses are designed to be globally unique layer-2 network interface hardware identifiers. Most modern network interfaces, including Ethernet, WiFi, and Bluetooth, utilize 48 bit IEEE MAC addresses. For several well-known reasons—notably that the MAC can permit manufacturer fingerprinting and that the identifier remains static across network changes thereby facilitating tracking—MAC addresses are considered sensitive.

MAC addresses are typically confined to layer 2, and thus cannot readily be discovered by a remote attacker who is not attached to the same subnet. A historical exception to this is the use of MAC addresses to automatically select the host bits of an IPv6 client, a process known as SLAAC EUI-64 addressing. Due to the aforementioned vulnerabilities, modern operating systems instead use privacy extensions, where the host bits of an IPv6 client are random and ephemeral.

Due to the vast size of the IPv6 address space, unmanaged network devices commonly generate their interface IPv6 addresses through a process known as Stateless Address Autoconfiguration (SLAAC) rather than having one assigned via DHCPv6. The sheer number of addresses available makes the probability of more than one device choosing the same address infinitesimally small, given a suitable algorithm for choosing an identifier. Early IPv6 specifications encouraged the use of EUI-64 IPv6 addresses, wherein the lower 64 bits (the Interface Identifier (IID)) of the 128-bit IPv6 address are an embedding of the interface MAC address. Two steps are required to create a modified EUI-64, which becomes the IID of an EUI-64 IPv6 address. First, the second-least-significant bit of the most significant byte of the MAC address, the so-called Universal/Local (U/L) bit, is set. Second, the bytes 0xff 0xfe are inserted between the third and fourth bytes of the MAC. FIG. 1 shows an EUI-64 IPv6 address 100 created using an embedding of the MAC address 00:11:22:33:44:55. The EUI-64 IPv6 address 100 includes an IPv6 prefix 102 and an EUI-64 IID 104.

Modern devices, particularly end systems, no longer employ EUI-64 SLAAC addressing for several reasons. First, the use of a static, unique IID (the lower 64 bits of an IPv6 address) allows devices to be tracked over time and space. Second, embedding the MAC address in the IID fingerprints the device to manufacturer granularity; further subdivision of the MAC address space to model granularity has been observed. Knowledge of the device's manufacturer can enable attackers to tailor their attacks to those that are most likely to succeed on the target system. Instead, many modern devices employ SLAAC with privacy extensions (SLAAC PE). In SLAAC PE, IIDs are generated randomly and expire after a fixed time interval elapses, after which a new IID is generated. Through the creation of random, ephemeral addresses, SLAAC PE eliminates the indefinite use of a permanent identifier as the IID and decouples the device manufacturer's identity from the IPv6 address.

Home gateways, or CPE, however, frequently employ the legacy EUI-64 addressing mode despite the security and privacy issues inherent in embedding a MAC address in an IPv6 address. Previous studies discovered millions of CPE devices continuing to use EUI-64 SLAAC addresses despite the introduction of SLAAC PE nearly 20 years ago.

IP addresses are logical network identifiers; while IP addresses may identify a network or operator and hint at the location, the associated device may physically be located anywhere. Further, the device itself may not wish to reveal its location for privacy reasons or may be unable to geolocate itself. As a result, a rich body of research has developed IP geolocation techniques that allow a third-party to map an arbitrary IP address to a physical location. Multiple commercial IP geolocation services exist to support applications including, but not limited to: location-based targeted advertising, content and language customization, geo-fencing of content, law and policy enforcement, anti-fraud, authentication, and forensic security.

Well-known methods for IP geolocation include: i) registry databases, e.g., whois and the DNS; ii) constraint-based techniques that leverage speed-of-light delay constraints to triangulate an address from known anchor points; iii) topology; and iv) privileged feeds.

While these geolocation services impinge on the privacy of the devices and users that they locate, to-date they provide only a relatively course-grained location, e.g., at the city granularity. Further, several studies have found inaccuracies in both the techniques and the commercial databases as compared to ground truth. For instance, it has been found that 50-90% of ground-truth locations to be geolocated with greater than 50 km of error; a more recent study of eight commercial geolocation databases found mean errors ranging from 50-657 km.

BRIEF DESCRIPTION

In accordance with one embodiment of the present disclosure, disclosed is discovering and clustering Internet protocol addresses. For example, embodiments can include discovering an IPv6 address of an Internet-facing device on a network, where the IPv6 address is associated with a wide area network (WAN) media access control (MAC) address and a WiFi basic service set identifier (BSSID), identifying an associated BSSID in WiFi geolocation databases based on the WAN and WiFi BSSID, and geolocating the Internet-facing device by retrieving a location record in the WiFi geolocation databases for the associated BSSID.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
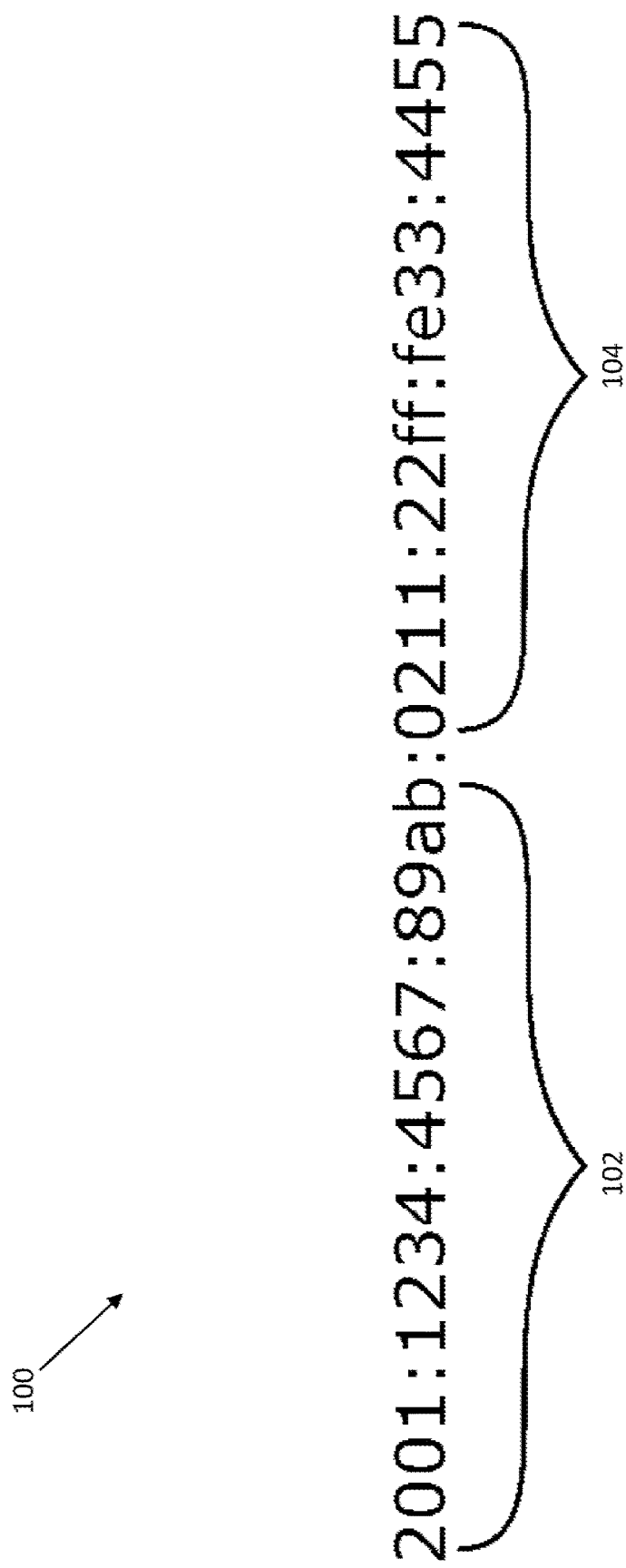
FIG. 1 shows an EUI-64 IPv6 address in accordance with the prior art.

Embodiments herein describe IPvSeeYou, a novel privacy attack that permits a remote and unprivileged adversary to physically geolocate residential IPv6 hosts and networks with street-level precision. The crux of the methodology lies in remotely extracting wide area (WAN) hardware MAC addresses from home modems, correlating these MAC addresses with their WiFi MAC counterparts of a known location, and associating devices connected to a common penultimate router.

Embodiments leverage high-speed active network probing to obtain a large corpus of MAC addresses embedded in IPv6 addresses that are leaked up the protocol stack. These MAC addresses largely represent WAN interfaces of residential modems, many of which are all-in-one devices that also have WiFi. In some cases, a technique is used to statistically infer the mapping between a devices's WAN and WiFi MAC addresses across different manufacturers and devices and mount a data fusion attack that correlates WAN MACs with WiFi BSSIDs available in wardriving (geolocation) databases. IPv6 prefixes of >12M modems are geolocated in the wild across 147 countries. Selected validation confirms a geolocation error of at most 46 m. Technology and deployment constraints can be used to extend the attack to all IPv6 residential devices by clustering and associating modems with a common penultimate provider router. While the results were disclosed to two manufacturers, the ossified ecosystem of deployed residential cable and DSL modems implies that an attack as described herin will remain a threat into the foreseeable future.

To overcome the challenge of finding active hosts and networks amid the vast IPv6 address space, prior techniques on high-speed active IPv6 network topology and periphery discovery can be leveraged to obtain a large corpus of residential Customer Premises Equipment (CPE) devices, i.e. residential home cable and DSL modems providing IPv6 service. Surprisingly, more than 60 M of these CPE use EUI-64 addresses, likely because they are running older operating systems and legacy configurations inherent in embedded devices.

Beyond this relatively minor privacy weakness, embodiments rely on the fact that many of these CPE devices are System-on-a-Chip (SoC) designs, with multiple network interfaces where each interface is assigned a MAC address sequentially from a small range. For example, an all-in-one device with a Wide Area Network (WAN), LAN, and WiFi interface where the WAN address is e.g. aa:bb:cc:dd:ee:01, the LAN address is aa:bb:cc:dd:ee:02, and the WiFi BSSID is aa:bb:cc:dd:ee:03. Once this offset from the WAN MAC address to the WiFi MAC address is known, an attempt to search for the BSSID can be performed in available wardriving databases, e.g. Wireless Geographic Logging Engine (WiGLE), Apple, and others. The ability to bind an IPv6 address of a CPE in the wild to its corresponding WiFi BSSID leads to the following fundamental contribution: street-level geolocation of the IPv6 network prefixes assigned to these CPE as described below with respect to FIG. 2.

Furthermore, the geolocation inferences described above are not limited to devices and implementations using legacy EUI-64 addressing. Where EUI-64 and non-EUI-64 devices are both deployed in a provider, those devices connected to the same upstream provider router can be clustered to establish a feasible location for non-EUI-64 devices. Thus, if even a single EUI-64 device is connected to a provider router, it compromises the privacy of the other customers that are also connected to that router. Because the software on CPE is rarely upgraded, and the devices themselves are infrequently replaced, this privacy attack is expected to remain a threat into the foreseeable future. Accordingly, embodiments herein include the following improvements:

An algorithm to infer, per-manufacturer and device, the offset between a CPE's WAN and WiFi interface MAC addresses.

Street-level geolocation of 12M IPv6 CPE—and the IPv6 customer prefixes they serve—across 147 countries leveraging an offset algorithm and performing data fusion with available wardriving databases.

Validation of IPvSeeYou on a subset of geolocation inferences with a mean error of 24 m, suggesting that the technique is accurate and precise.

Extension of the technique to all IPv6 CPE by clustering geolocated devices and associating them with non-EUI-64 devices.

Initial steps toward remediation, via informed disclosure to several equipment manufacturers.

Limitations of IPvSeeYou and ethical considerations of these embodiments are discussed below. The background on the two sources of data fused, IPv6 addresses and IP geolocation, as well as related work in IPv6 network measurement and geolocation for context are described above in the background.

The extraordinarily large address space of IPv6 removes the need for Network Address Translation (NAT). Whereas NAT is ubiquitous in residential and IPv4 networks, IPv6 restores an end-to-end connectivity model whereby the CPE device is a routed hop in IPv6. This requires a novel approach to CPE discovery in IPv6. The "edgy" algorithm is specifically aimed at discovering the IPv6 network periphery, i.e. the CPE that connect customer edge networks to the IPv6 Internet. With edgy, 5 million unique MAC addresses are discovered in 16 million EUI-64 IPv6 addresses, but no attempt is made to correlate these MAC addresses with wireless identifiers, as described in embodiments herein. In these embodiments, data from various geolocation databases can be collected and used to discover IPv6 CPE devices, enumerate their open ports and exposes services, and develop a novel routing loop attack affecting 24 router vendors.

Other techniques rely on the observation that the 802.11 WiFi and Bluetooth MAC addresses assigned to mobile devices are often sequential, allowing passive adversaries within wireless transmission range to correlate these identifiers with the same physical device. Embodiments described herein also leverage the fact that device manufacturers assign hardware identifiers sequentially even across different link-layer technologies; and, unlike the prior art, the described invention does not require an attacker to be physically proximate to the target and is intended to geolocate rather than correlate identifiers with the same device.

Embodiments herein rely on CPE containing two key facets—the use of global-scope EUI-64 addresses on their Internet-facing interface, and sequential MAC address assignment to the device's interfaces, including both wired and wireless NICs. EUI-64 addressing allows an adversary to remotely obtain MAC addresses from vulnerable devices by eliciting responses from network probes (e.g. traceroute, zmap6). Sequential MAC address assignment allows an adversary to link the wired MAC addresses obtained from active network probing to wireless BSSIDs from wardriving or other WiFi geolocation databases. In some embodiments, the technique described herein can be extended to all CPE, including those using privacy extensions.

Figure 2:
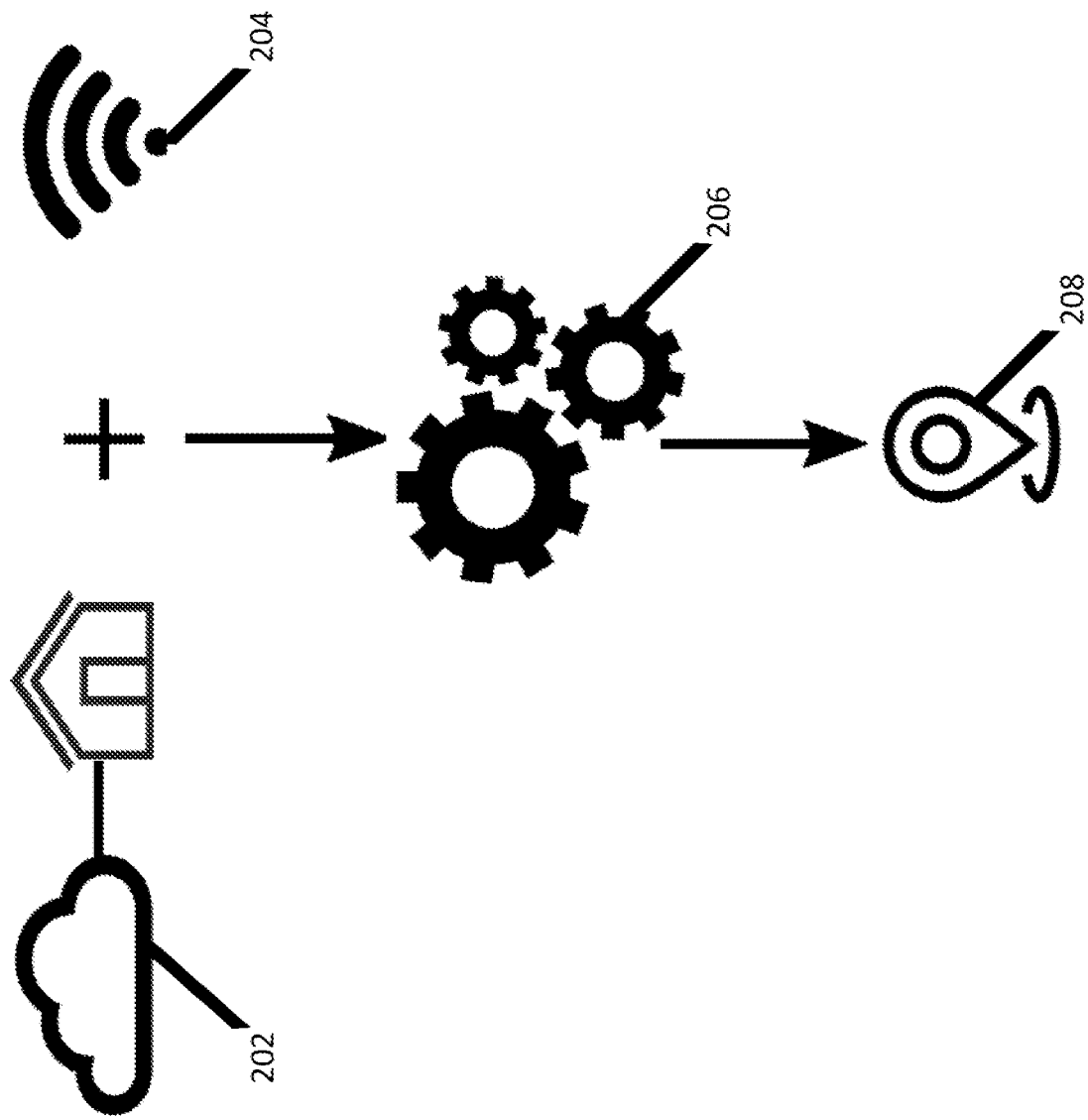
FIG. 2 shows an IPvSeeYou attack in accordance with one or more embodiments.

FIG. 2 shows an IPvSeeYou attack in accordance with one or more embodiments. Initially, MAC addresses derived from EUI-64 IPv6 responses of active network measurement campaigns 202 and WiFi geolocation databases 204 are merged. Then, in 206, a matching algorithm produces a per-OUI offset metric for correlating EUI-64-embedded MAC addresses and wireless BSSIDs. In 208, an attacker searches the merged databases for the offset metric to geolocate the IPv6 CPE with street-level precision.

Figure 3:
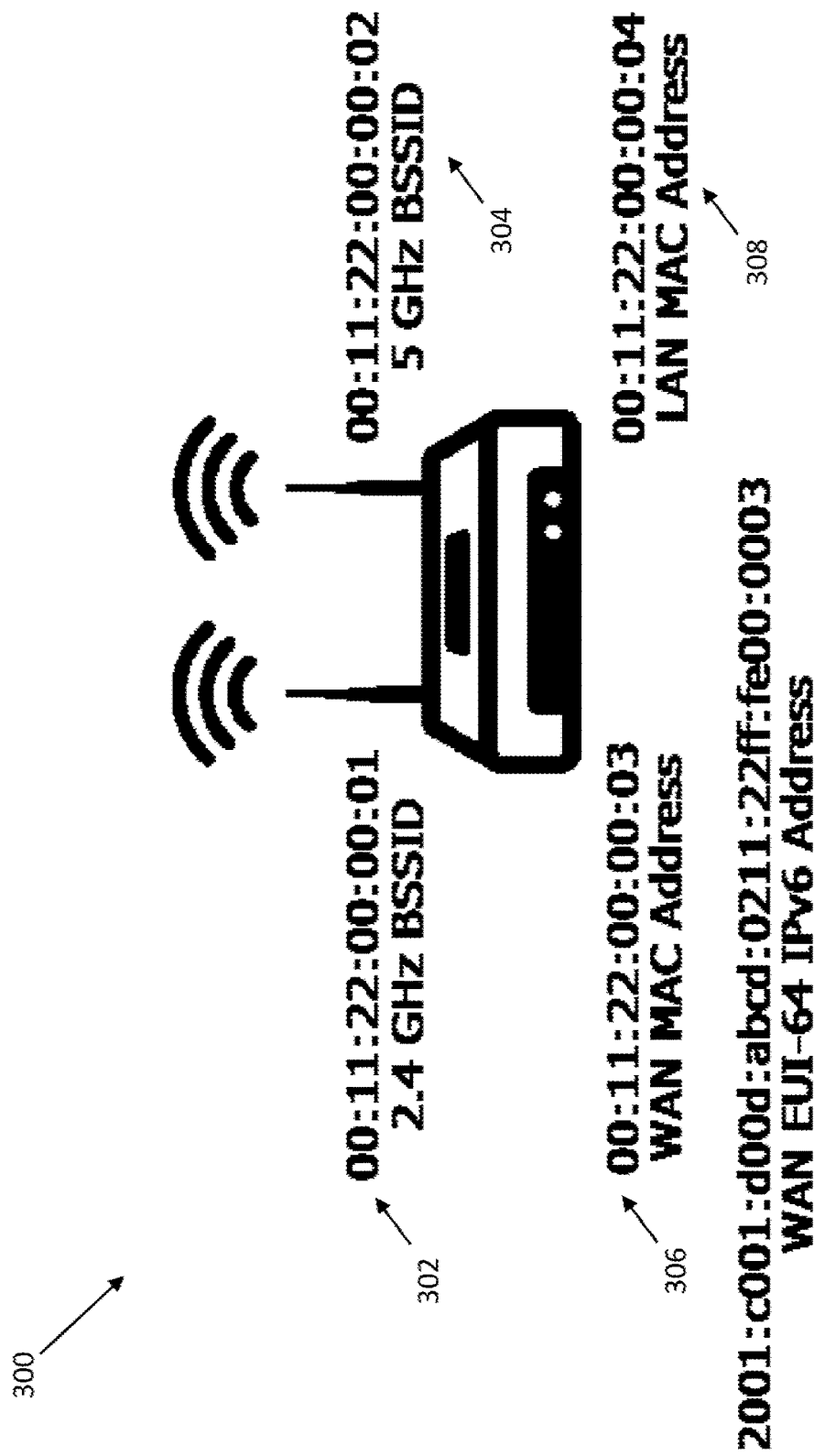
FIG. 3 shows a router that is vulnerable to embodiments described herein.

FIG. 3 shows a router 300 that is vulnerable to the IPvSeeYou geolocation technique. Each of its interfaces 302-308 is addressed sequentially from the same 00:11:22 OUI; furthermore, the router 300 generates its WAN IPv6 address 310 using the modified EUI-64 derived from the WAN MAC address 306. This allows its WAN MAC address 306 to be discovered by active network measurements that elicit a response from the CPE, such as via traceroute, Yarrp, or zmap. Its 802.11 BSSIDs 302, 304 may be discovered in wardriving databases, such as WiGLE, or appear in crowd-sourced WiFi geolocation services. The offset distance between the WAN MAC address 306 and BSSIDs 302, 304 (in FIG. 3, −1/−2) typically remains fixed throughout an OUI, or at a minimum, for specific device models within an OUI. This allows an attacker who has discovered CPE MAC addresses 306, 308 from active network scans to predict the device's BSSID(s) 302, 304 to look up in WiFi geolocation data, or fuse previously-obtained sources of data together.

Returning to FIG. 2, a large corpus of EUI-64 IPv6 addresses 202 can be used such as those used by researchers that developed a novel algorithm for IPv6 "periphery" discovery, where "periphery" consists of CPE routers at the IPv6 customer edge. For example, an iterative, targeted scanning algorithm can be used that discovers CPE routers in subscriber networks using Yarrp, a high-frequency topology prober. In another example, an "edgy" algorithm can be used to collect new periphery IPv6 addresses.

The active IPv6 edgy probing results include a large number of responses where the IPv6 address embeds a MAC address. EUI-64 IPv6 addresses 202 are readily identifiable—the MAC addresses are simply decoded from EUI-64 response addresses by removing the fourth and fifth bytes (ff:fe) of the IID, then inverting the Universal/Local (U/L) bit of the remaining 48-bit MAC address. The corpus contains 347,897,981 EUI-64 IPv6 addresses 202 embedded with 60,690,150 unique MAC addresses. Some MAC addresses appear in multiple EUI-64 IPv6 addresses 202 due to ephemeral prefix leases provided through temporary-mode DHCP, while smaller numbers of repeated MACs occur due to MAC address reuse by manufacturers.

Because the same MAC address can appear in many EUI-64 IPv6 addresses 202, the EUI-64 embedded MAC address can be used as the primary unit of measure to characterize the data. For example, Versatel 1&1's (AS8881) prefix delegation policy causes many CPE devices to generate new EUI-64 addresses every 24 hours; in other providers, the delegated prefix and CPE EUI-64 address may remain stable for several months. Of the 60 million total MAC addresses in the EUI-64 IPv6 data set 202, 126,730 (0.2%) MAC addresses were observed in EUI-64 addresses in multiple Autonomous Systems (ASes). While some of these MAC addresses may belong to devices whose owners change service providers during active measurements, these MAC addresses were excluded from characterization herein due to the possibility these MAC addresses are not unique to a single device.

The remaining 60,571,842 MAC addresses are embedded in EUI-64 IPv6 addresses from ASes corresponding to 200 different countries as determined by Team Cymru's IP to ASN service. China contributes the largest fraction at 35%; the top ten countries each add over 1 million MAC addresses to the total. Although China is the nation with the highest MAC address count, Comcast, an American Internet Service Provider (ISP), is the leading AS with over 10 million distinct MAC addresses derived from EUI-64 addresses. Comcast dominates the US contribution with 91% of the US EUI-64-derived MAC addresses; Guangdong Mobile, the leading Chinese AS, contributes only 37% of the total Chinese MAC addresses by contrast. Four of the top five OUIs the MAC addresses fall into resolve to China Mobile IOT Company; the fifth (F0:3C:91) is not listed in the registered OUIs. However, all instances of MAC addresses using this OUI originate in EUI-64 IPv6 addresses coming from Linode, an American cloud hosting provider, networks. Table 1 below summarizes this data.

TABLE 1

Summary of top countries, ASes, and OUIs of MACs embedded in EUI-64 IPv6 addresses. MAC addresses found in more than one AS are not included to account for potential MAC address reuse.

| Country | Count | AS | Count |
|---|---|---|---|
| CN | 21,425,581 (35.4%) | Comcast (AS7922) | 10,188,218 (16.8%) |
| US | 11,196,587 (18.5%) | Guangdong Mobile (AS9808) | 8,004,879 (13.2%) |
| DE | 9,265,924 (15.3%) | Deutsche Telekom (AS3320) | 6,353,101 (10.5%) |
| BR | 3,404,573 (5.6%) | France Telecom (AS3215) | 2,746,829 (4.5%) |
| FR | 2,753,927 (4.5%) | China Unicom (AS4837) | 2,399,925 (4.0%) |
| 195 Other | 12,525,250 (20.7%) | 12,651 Other | 30,878,890 (51.0%) |

| OUI/Manufacturer | Count |
|---|---|
| 14:AD:CA/China Mobile IOT | 904,783 (1.5%) |
| F0:3C:91/Unknown | 885,386 (1.5%) |
| B0:30:55/China Mobile IOT | 875,657 (1.4%) |
| FC:8E:5B/China Mobile IOT | 839,804 (1.4%) |
| FC:F2:9F/China Mobile IOT | 738,947 (1.2%) |
| 463,183 Other | 56,327,265 (93.0%) |

Geolocation data 204 can be aggregated from various sources such as open-source geolocation databases like Mylnikov's Geo-Location API Download, openwifi.su, OpenBMap Dataset, the WiGLE search API, and Apple's WiFi geolocation service. The methodologies described herein are agnostic to the source of data.

The most recent geolocation database released by Alexander Mylnikov contains 23,350,658 locations of 20,226,869 distinct BSSIDs (some BSSIDs have multiple geolocations) and was collected between September 2016 and December 2019. The OpenBMap database contains 15,384, 623 BSSIDs with 15,682,245 positions acquired between 2011 and 2020. The OpenWifi.su dataset contains 29,340, 881 corresponding to 29,340,869 geolocations released in August 2019. All three of these databases rely on war-driving contributors, and as such, are biased toward the locations of contributors.

The WiGLE search API was queried between February and April 2021 to obtain 1,367,700 geolocated BSSID. WiGLE data set BSSIDs can be collected by independent war-drivers, who submitted the BSSIDs to WiGLE between May 2004 and April 2021.

Finally, BSSID geolocation data 204 can be obtained using Apple's WiFi geolocation service. Apple provides this API for its products to geolocate themselves as part of its Location Services suite of tools; the API accepts an 802.11 BSSID to be geolocated as a search parameter. If Apple has geolocation data for this BSSID, it returns these data, optionally with location information for Access Points (APs) near the queried BSSID. The purpose of returning the additional geolocation information is presumably to short-circuit API requests from the same client as it encounters these additional nearby APs.

Instead, the Apple geolocation API can be used as an oracle to validate the existence of BSSIDs that are suspect to be related to EUI-64 MAC addresses. In step 206, the location service can be queried for suspected BSSIDs derived from small offsets from the MACs obtained as described above. When correctly guessed, the geolocation service returns not only the coordinates of the guessed BSSID in step 208 but additionally up to 400 nearby BSSIDs and their geolocations. This results in the largest WiFi geolocation dataset, with 444,860,460 unique BSSIDs.

In total, the BSSID geolocation data is comprised of 450,018,123 distinct BSSIDs in 238 countries. Table 2 summarizes macro-level characteristics of the geolocation data.

assignment of MAC addresses is vendor and device dependent. In the trivial case, the WiFi BSSID MAC is exactly one greater than the WAN MAC address. Other CPE have more interfaces and different MAC address offsets. For example, FIG. 3 shows a CPE 300 with four interfaces, one for the LAN 308, one for the WAN 306, and one for each of two different radio WiFi frequencies 302, 304. In this example, the BSSID MAC address value 304 is two less than the WAN address 308. In practice, more complex allocations exist and there is a wide variety of allocations and offsets in deployed CPE.

To enable the data fusion, a mapping of the offsets between interface MAC addresses on a per-OUI basis can be used. Unfortunately, vendors do not publish their MAC address assignment policy, and even a single vendor frequently uses different strategies for different devices. Some CPE devices were analyzed to obtain limited ground truth; however, in many cases the devices themselves do not expose their MAC addresses through their management interface or have the addresses printed on the device. Further, many devices are only regionally available or not readily available for purchase.

Thus, given the huge variety of vendors and deployed CPE devices in the Internet, the invention uses an algorithm to infer the MAC address offsets. The large number of WAN and WiFi MAC addresses, described above, are used to capture this diversity and build a database of offsets for different devices.

Figure 4:
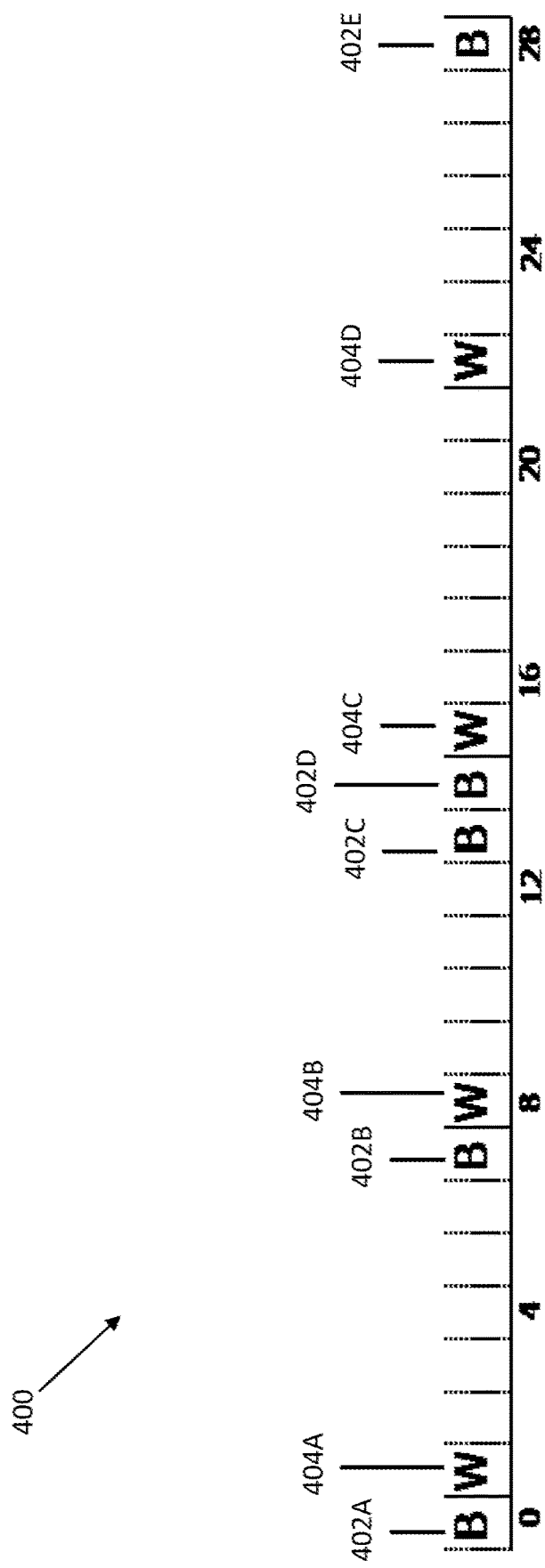
FIG. 4 shows an interface map for a device manufacturer.

A naïve approach to building this mapping is simply associating a WAN MAC with the numerically nearest BSSID MAC. However, FIG. 4 shows an interface map 400 for a manufacturer, which exhibits how that simplistic algorithm fails for a particular CPE for which ground truth is known. This example device uses a block of seven contiguous MAC addresses for its various interfaces. The lowest MAC address is given to the WAN address while the highest is given to the 2.4 Ghz WiFi interface. Thus, the true

TABLE 2

Number of BSSIDs included in an example geolocation data set by geolocated country, BSSID manufacturer, and data source. The total number of unique BSSIDs is less than the sum of the individual data sources due to some BSSIDs existing in multiple data sets. A small number of BSSIDs (particularly small constants such as 00:00:00:00:00:01) geolocate to multiple countries.

| Country | Count | Manufacturer | Count |
|---|---|---|---|
| US | 119,591,390 (26.6%) | A0:65:18/VNPT Technology | 2,206,621 (0.5%) |
| DE | 78,034,169 (17.3%) | 98:9B:CB/AVM GmbH | 1,352,222 (0.3%) |
| BR | 37,245,817 (8.3%) | 3C:A6:2F/AVM GmbH | 1,320,865 (0.3%) |
| FR | 32,464,391 (7.2%) | 7C:FF:4D/AVM GmbH | 1,311,865 (0.3%) |
| JP | 28,170,359 (6.3%) | 38:10:D5/AVM GmbH | 1,282,799 (0.3%) |
| 233 Other | 154,588,509 (34.3%) | 850,083 Other | 442,543,751 (98.3%) |

| Source | Count |
|---|---|
| Apple API | 444,860,460 |
| OpenWifi.su | 29,340,881 |
| Mylnikov | 20,226,869 |
| OpenBMap | 15,384,623 |
| WiGLE | 1,367,700 |
| Total | 450,018,123 |

Key to embodiments herein is correlating addresses between network interfaces on a CPE device. Given a IPv6 address with an embedded MAC address of the WAN interface, it is desired to determine the MAC address of the corresponding WiFi interface on the CPE. However, the offset is +6. Because of this allocation, the nearest match association can result in the WAN address of one device being associated with the BSSID of a different device; for example, the addresses at positions 7 402B and 8 404B in FIG. 4. Also in the data are MACs corresponding to different WiFi radio frequencies. For instance, this model of device also has a 5 Ghz WiFi interface, but at an offset of +5.

Further, the data may include a single MAC address for the device, i.e. either just the WAN or just the BSSID. Missing data is common and can occur simply because the WiFi database never picked up a signal from this device, the network blocks the probes, or there is some other form of filtering. For example, FIG. 4 shows one device where only the WAN MAC address is present in the data (at position 15 404C). In these cases, the nearest matching BSSID may be a multiple of the true offset, for instance +12. Missing data, multiple in-block BSSIDs, and very sparse or dense OUIs therefore complicate the inferences.

In some embodiments, a per-OUI map and WiFi and WAN data are built for each OUI is proceeded in two phases. First, the mostly likely allocation size for the OUI is determined, i.e. how many MAC addresses are allocated to each device. The BSSID MACs are sorted in the OUI to build a distribution of intra-MAC distances. Thus, for n input BSSIDs, n−1 distances are computed between these points. Next, the most frequent distance is found and then used to determine how many of the samples in the distribution correspond to a multiple of this distance by computing the greatest common denominator. If the fraction of distances that are multiples of this distance are high, then there is correspondingly high confidence that the inferred allocation size is correct.

Given the inferred allocation size, the next phase of the algorithm iterates through each EUI-64 MAC address that belongs to the OUI, in ascending sorted order. Because the matching WiFi MAC address may be at either a positive or negative offset, the algorithm finds both the closest corresponding BSSID less than and greater than the EUI-64, subject to the constraint that these must be within a window determined by the inferred allocation size in the previous phase. Finally, the algorithm infers the offset for this device to be the most common offset among all the matches.

This process can include both correct and false associations, for instance the false association to the −1 offset BSSID versus the +6 offset BSSID in the example of FIG. 4. However, the intuition is that it will be more common for a single device to be present in the data with both its addresses than for two different devices with adjacent addresses. While exceptions can exist, especially for OUI with a large number of devices in the data, in practice, statistically choosing the offset produces the correct inference for the ground truth devices. The fraction of devices for the OUI that conform to the inferred offset can be computed such that there is an associated confidence measure.

Given a MAC address embedded in an EUI-64 IPv6 address, the final step 208 in the method of FIG. 2 is to use the database, as described above, to lookup the offset to the BSSID MAC given the OUI in question. Then, the BSSID MAC in the wardriving databases can be looked up to make the final geolocation inference. Note that if the OUI is not contained in the offset database, a geolocation determination cannot be made.

Methodologies described herein, which generate per-OUI WAN MAC to BSSID offset inferences, are susceptible to several limitations which can reduce their effectiveness. First, and most limiting, is a lack of ground truth. Although an effort was made to procure exemplar devices, it cannot be definitively determined whether the WAN to BSSID offset predictions are correct for the vast majority of manufacturers. In fact, because only a MAC address is received from active probing, it is impossible to determine even how many distinct device models are observed. However, the limited number of devices that were examined as exemplars and validated data points largely reinforce the methodology described above.

Although the methodology examines WAN MAC address to BSSID correlations on a per-OUI level, previous studies have shown that addresses from a single OUI are sometimes divided among multiple device models. This can potentially complicate the inference algorithm detailed above; if multiple devices with more than one distinct WAN MAC address to BSSID offset value exist within a single OUI, the algorithm may not capture this nuance, instead choosing the predominant offset value in the dataset. This limitation could be alleviated by inferring offsets at a finer granularity than per-OUI.

If the assumption that the WAN MAC address and BSSID are located in the same OUI is incorrect, the methodology outlined above will be unable to correctly resolve the two identifiers to the same device. For an OUI for which EUI-64-derived MAC addresses are observed, if the device's BSSID resides in a different OUI, the methodology will either 1) not discover any potential match from the BSSID geolocation data, or 2) erroneously pair the EUI-64-MAC addresses with an incorrect BSSID, if other device types' BSSIDs exist in that OUI. This shortcoming can be alleviated by a motivated adversary able to obtain ground truth exemplar devices, from which a WAN MAC to BSSID mapping can be obtained for a device-specific correlation algorithm.

Finally, the assumption that the periphery EUI-64 IPv6 addresses are also wireless routers may not be true for some number of addresses. For example, a user's home network may contain a standalone cable modem with an Internet-facing EUI-64 IPv6 address that is then connected by Ethernet to an AP. In this case, it may be impossible to predict the BSSID correlated with the WAN MAC address, as they are two entirely distinct devices.

As described above, the IPv6 geolocation capability applies only to CPE devices that use EUI-64 addressing and the prefixes associated with those devices. In these embodiments, the technique is extended to permit more general geolocation of CPE devices, including both EUI-64 CPE devices that cannot be geolocated directly through BSSID inference and those that do not use EUI-64 addressing at all.

In typical deployments, multiple CPE devices connect to, and are aggregated by, a single upstream provider router. Further, the network link between a CPE and its upstream router is generally relatively short due to protocol specifications and physical constraints. For example, with cable modems, the DOCSIS standard defines a maximum distance between the CMTS and the cable modem of 100 miles (160 km), but with a "typical maximum separation of 10-15 miles."

Geolocated EUI-64 CPE to can be leveraged to locate i) upstream provider last mile infrastructure; ii) EUI-64 CPE that cannot be geolocated using the methodology described with respect to FIG. 2; and iii) non-EUI-64 CPE. The basic intuition is straightforward: known locations of CPE devices can be used to infer the location of unknown CPE if they connect to the same last-hop router (and, hence, are physically close). Further, when the assumptions about the distance between a CPE and the router to which it connects are incorrect, e.g. with a virtualized network topology, this error will be reflected by a wide dispersion of geolocated devices and thus evident.

Using the technique for associating clusters of geolocated EUI-64 CPE with non-geolocatable EUI-64 and non-EUI-64 CPE, a new metric, "geolocation amplification", is defined to capture the coverage gain. The amplification is simply a reflection of how many additional CPE can be geolocated by leveraging the locations of other connected CPE. As an example, consider a geolocated CPE located near Olympia, WA, obtained by sending Yarrp traces to random IIDs in each /64 within a single /48. In this exemplar /48, 3,825 distinct CPE addresses can be discovered, including 1,776 (46%) EUI-64 and 2,049 ostensible SLAAC with privacy extensions addresses. Because /60 subnets are allocated to end-users in this /48, it would expect to see at most 4,096 unique IPv6 CPE addresses; thus, the /48 is nearly completely allocated and discoverable.

Employing the methodology described with respect to FIG. 2, 180 of the 1,776 EUI-64 CPE in the service provider's /48 can be geolocated to the Olympia, WA metropolitan region. Assuming that the distribution of non-geolocatable EUI-64 and non-EUI-64 CPE does not vary significantly from the 180 geolocated CPE, it is expected to find these "hidden" devices in approximately the same location as the 180 geolocated CPE. Thus, the methodology enables the geolocation of all 3,825 CPE as opposed to the 180 for which there are precise geolocations, a 20-fold increase in geolocated CPE.

In this description, a location privacy vulnerability that exists in millions of deployed IPv6 devices is described. Despite best current practices discouraging the use of EUI-64 IPv6 addresses and their disuse in most modern endpoint operating systems, many CPE devices continue to generate IPv6 addresses by embedding the interface's MAC address in the lower 64 bits of the IPv6 address. Further, many CPE manufacturers assign MAC addresses sequentially to the interfaces on their devices. Due to these two design choices, it is possible to fuse two large datasets, one consisting of EUI-64-derived MAC addresses, the other of WiFi BSSID geolocations, to correlate these identifiers and discover the physical location of millions logical IPv6 addresses.

Toward this end, a novel algorithm is described herein to determine the number of MAC addresses assigned to individual CPE devices and infer the offset between the WAN interface MAC address and WiFi BSSID. It was found that over 12M EUI-64 IPv6 addresses in 147 countries could be matched to WiFi BSSIDs using the correlation algorithms. Not only does this privacy vulnerability impact device owners whose products implement this legacy technology, but nearby devices connected to the same provider router can also be geolocated due simply to their proximity to EUI-64 CPE. The insecurity of even a few devices legacy jeopardizes the privacy of all of their neighbors, no matter how privacy conscious.

Due to the consequences of a location privacy attack, several CPE vendors whose products use both EUI-64 addressing by default as well as assign sequential MAC addresses to device interfaces were contacted. These results lead to the deprecation of EUI-64 addressing by one manufacturer, to be released to millions of customers.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for discovering and clustering Internet protocol addresses, the method comprising:
   discovering an IPv6 address of an Internet-facing device on a network, wherein the IPv6 address is associated with a wide area network (WAN) media access control (MAC) address and a WiFi basic service set identifier (BSSID);
   identifying an associated BSSID in WiFi geolocation databases based on the WAN and WiFi BSSID, wherein identifying the associated BSSID further comprises:
   determining an address offset between the WAN MAC address and the WiFi BSSID, and
   identifying the associated BSSID in the WiFi geolocation databases based on the address offset;
   geolocating the Internet-facing device by retrieving a location record in the WiFi geolocation databases for the associated BSSID; and
   generating a MAC offset database based on the WiFi geolocation databases, wherein the address offset is obtained from the MAC offset database, wherein generating the MAC offset database further comprises:
   associating each organizationally unique identifier (OUI) with a MAC allocation size and a distribution of intra-MAC distances,
   determine a most frequent distance for the each OUI based on the MAC allocation size and the distribution of intra-MAC distances, and
   identifying corresponding MAC addresses that best match the most frequent distance, the MAC allocation size, and the distribution of intra-MAC distances for the each OUI.

2. The method of claim 1, wherein discovering the IPv6 address comprises:
   obtaining a network packet from the Internet-facing device; and
   extracting the IPv6 address from the network packet.

3. The method of claim 1, wherein the Internet-facing device is an upstream network device, and wherein the method further comprises:
   obtaining a client network packet from a consumer device; and
   identifying the upstream network device based on the client network packet.

4. A method for discovering and clustering Internet protocol addresses, the method comprising:
discovering an IPv6 address of an Internet-facing device on a network, wherein the IPv6 address is associated with a wide area network (WAN) media access control (MAC) address and a WiFi basic service set identifier (BSSID);
determining an address offset between the WAN MAC address and the WiFi BSSID;
identifying an associated BSSID in WiFi geolocation databases based on the address offset;
geolocating the Internet-facing device by retrieving a location record in the WiFi geolocation databases for the associated BSSID; and
generating a MAC offset database based on the WiFi geolocation databases, wherein the address offset is obtained from the MAC offset database, wherein generating the MAC offset database further comprises:
associating each organizationally unique identifier (OUI) with a MAC allocation size and a distribution of intra-MAC distances,
determine a most frequent distance for the each OUI based on the MAC allocation size and the distribution of intra-MAC distances, and
identifying corresponding MAC addresses that best match the most frequent distance, the MAC allocation size, and the distribution of intra-MAC distances for the each OUI.

5. The method of claim 4, wherein discovering the IPv6 address comprises:
obtaining a network packet from the Internet-facing device; and
extracting the IPv6 address from the network packet.

6. The method of claim 4, wherein the Internet-facing device is an upstream network device, and wherein the method further comprises:
obtaining a client network packet from a consumer device; and
identifying the upstream network device based on the client network packet.

7. A non-transitory computer-readable medium comprising executable instructions for discovering and clustering Internet protocol addresses by causing a computer system to:
discover an IPv6 address of an Internet-facing device on a network, wherein the IPv6 address is associated with a wide area network (WAN) media access control (MAC) address and a WiFi basic service set identifier (BSSID);
identify an associated BSSID in WiFi geolocation databases based on the WAN and WiFi BSSID, wherein identifying the associated BSSID comprises:
determining an address offset between the WAN MAC address and the WiFi BSSID, and
identifying the associated BSSID in the WiFi geolocation databases based on the address offset;
geolocate the Internet-facing device by retrieving a location record in the WiFi geolocation databases for the associated BSSID; and
generate a MAC offset database based on the WiFi geolocation databases, wherein the address offset is obtained from the MAC offset database, wherein generating the MAC offset database further comprises:
associating each organizationally unique identifier (OUI) with a MAC allocation size and a distribution of intra-MAC distances,
determine a most frequent distance for the each OUI based on the MAC allocation size and the distribution of intra-MAC distances, and
identifying corresponding MAC addresses that best match the most frequent distance, the MAC allocation size, and the distribution of intra-MAC distances for the each OUI.

8. The non-transitory computer-readable medium of claim 7, wherein discovering the IPv6 address comprises;
obtaining a network packet from the Internet-facing device; and
extracting the IPv6 address from the network packet.

9. The non-transitory computer-readable medium of claim 7, wherein the Internet-facing device is an upstream network device, and wherein the instructions are further for causing the computer system to:
obtain a client network packet from a consumer device; and
identify the upstream network device based on the client network packet.

* * * * *